United States Patent
Knowlton et al.

(10) Patent No.: US 6,235,132 B1
(45) Date of Patent: May 22, 2001

(54) GAS GENERATING COMPOSITIONS

(75) Inventors: Gregory D. Knowlton, Chandler; Christopher P. Ludwig, Fountain Hills, both of AZ (US)

(73) Assignee: Talley Defense Systems, Inc., Mesa, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 09/114,196

(22) Filed: Jul. 13, 1998

Related U.S. Application Data

(63) Continuation-in-part of application No. 08/706,198, filed on Aug. 30, 1996, now Pat. No. 5,780,768, which is a continuation-in-part of application No. 08/402,103, filed on Mar. 10, 1995, now Pat. No. 5,551,725.

(51) Int. Cl.⁷ .................................................. C06B 31/00
(52) U.S. Cl. ........................... 149/36; 149/19.7; 149/45; 149/46; 149/61; 149/76; 149/77
(58) Field of Search .............................. 149/36, 45, 19.7, 149/46, 61, 76, 77

(56) References Cited

U.S. PATENT DOCUMENTS

| | | | |
|---|---|---|---|
| Re. 32,584 | 1/1988 | Pietz | 423/351 |
| 2,555,333 * | 6/1951 | Grand et al. | 149/45 |
| 2,904,420 * | 9/1959 | Holker | 149/61 |
| 3,883,373 | 5/1975 | Sidebottan | 149/6 |
| 3,919,015 * | 11/1975 | Bolza | 149/42 |
| 4,632,714 | 12/1986 | Abegg et al. | 149/2 |
| 4,673,527 | 6/1987 | Goudy, Jr. et al. | 252/181 |
| 4,812,308 | 3/1989 | Winston et al. | 424/52 |
| 4,865,635 | 9/1989 | Cuevas | 55/276 |
| 4,907,819 | 3/1990 | Cuevas | 280/736 |
| 4,923,212 | 5/1990 | Cuevas | 280/736 |
| 5,035,757 * | 7/1991 | Poole | 149/46 |
| 5,401,340 | 3/1995 | Doll et al. | 149/22 |
| 5,411,615 | 5/1995 | Sumrail et al. | 149/47 |
| 5,429,691 | 7/1995 | Hinshaw et al. | 149/45 |
| 5,439,537 | 8/1995 | Hinshaw et al. | 149/22 |
| 5,500,059 | 3/1996 | Lund et al. | 149/19.1 |
| 5,501,823 | 3/1996 | Lund et al. | 264/3.1 |
| 5,531,941 | 7/1996 | Poole | 264/3.4 |
| 5,538,567 | 7/1996 | Henry, III et al. | 149/18 |
| 5,545,272 | 8/1996 | Poole et al. | 149/48 |
| 5,551,725 | 9/1996 | Ludwig | 280/737 |
| 5,641,938 | 6/1997 | Holland et al. | 149/48 |
| 5,725,699 * | 3/1998 | Hinshaw et al. | 149/19.1 |
| 5,739,460 * | 4/1998 | Knowlton et al. | 102/324 |
| 5,780,768 * | 7/1998 | Knowlton et al. | 149/36 |
| 5,959,242 * | 9/1999 | Knowlton et al. | 149/36 |

\* cited by examiner

Primary Examiner—Edward A. Miller

(57) ABSTRACT

A pyrotechnic material comprising at least one fuel and an oxidizer of ceric ammonium nitrate or a mixture of ceric ammonium nitrate and one or more other oxidizers, and, optionally, sub-micron (i.e., having an average particle size of less than about 1 $\mu$m) fumed silica for use as a low-solids gas generating composition. When the oxidizer-fuel mixture is within about 4 percent of stoichiometric balance, the pyrotechnic material provides a low solids gas generant less than about 30 percent solids on combustion, and may be formed as pressed pellets, grains, or granules for use in automotive passive restraint systems.

19 Claims, No Drawings

GAS GENERATING COMPOSITIONS

This application is a continuation-in-part of U.S. application Ser. No. 08/706,198, filed Aug. 30, 1996, now U.S. Pat. No. 5,780,768, which is a continuation-in-part of U.S. application No. Ser. No. 08/402,103, filed Mar. 10, 1995, now U.S. Pat. No. 5,551,725, the teaching of which are incorporated herein in their entirety by reference.

FIELD OF THE INVENTION

The invention generally relates to pyrotechnic materials, comprising at least one fuel and an oxidizer comprising ceric ammonium nitrate. The pyrotechnic materials of the invention are useful in most pyrotechnic applications requiring a mixture of a fuel and oxidizer, but are particularly useful in gas generating compositions or gas generants, such as those used in "air bag" passive restraint systems, that have a low solids output on combustion.

BACKGROUND OF THE INVENTION

Gas generators, i.e., devices for producing gas, have become more common place in the field of pyrotechnics over the last 20 years, mainly due to the increased use of automotive air bags. Typically, an automotive air bag gas generator, which is referred to as an inflator, contains a gas generant, i.e., a pyrotechnic material that generates a gas during combustion. The gas generant in the inflator in a vehicle air bag passive restraint system is typically a pyrotechnic material comprising a fuel and an oxidizer or, in the case of mono-propellants, such as nitrocellulose, a fuel having an integral oxidizer. The gas generant must provide the gas required to deploy and fill the air bag in a matter of milliseconds when an actuation signal is received by the system, and the air bag inflator must perform properly during an accident at any point in the useful life of the vehicle. The fact that an inflator may be required to rapidly fill an air bag after 10 or more years of storage places a number of constraints on inflator design, which are dictated by the required performance of the restraint system, i.e., the time required for the full deployment of the air bag, reliability (including environmental exposure and storage life), the safety and health of vehicle occupants, air bag volume, and the interface between the restraint system and the vehicle. The inflator specification that results from these constraints defines the form, fit, and function criteria for the inflator.

An example of a filterless inflator is provided in parent U.S. Pat. No. 5,551,725, which is incorporated herein by reference. The inflator described in the above identified application comprises a contained volume, a source of gas for producing an inflation gas, an initiating system for initiating the conversion of the source of gas to the inflation gas, and an exhaust orifice that provides an exhaust path and controls the flow of the inflation gas. The source of gas is typically a mixture of a fuel and oxidizer that is stable, and will not ignite until the initiating system ignites the mixture to produce the inflation gas.

A typical inflator functions by converting an electrical or mechanical initiating signal into the generation of a precisely controlled quantity of gas at precisely controlled rates. Generally, this is accomplished by an inflator pyrotechnic train, which comprises an 'initiation' device called an initiator, an enhancer charge, and a main gas generant charge, all of which are contained in the body of the inflator. In response to the initiating signal, the initiator ignites and produces a hot gas, particulates, and/or flame. The flame output of the initiator is typically small, and often requires enhancement to ignite the main gas generant charge. The initiator flame ignites the enhancer charge, which is a hot burning propellant, and augments the initiator output sufficiently to ignite the main gas generant charge. Once ignited, the gas generant burns to produce the hot gas required at a rate sufficient to fill the air bag module in the required time.

The restraint system performance is dictated, in part, by the need to fill and deploy the air bag in a matter of milliseconds. Under representative conditions, only about 60 milliseconds elapse between the primary impact of a vehicle in an accident and the secondary impact of the driver or passenger (herein after "an occupant") with a portion of the vehicle interior. Therefore, a very rapid generation or release of gas is required to fill the bag, and prevent the secondary impact. The amount and rate of gas generation or release is determined by the volume of the air bag required for the vehicle and the time between primary and secondary impacts.

In addition, to meet environmental and occupant safety and health requirements, the inflation gas produced by the inflator should be non-toxic and non-noxious when the inflator is functioned in an air bag module in a typical vehicle. The gas generated or released must also have a temperature that is sufficiently low to avoid burning the occupant and the air bag, and it must be chemically inert, so that the mechanical strength and integrity of the bag are not degraded by the gas.

The stability and reliability of an inflator gas generant over the life of the vehicle are extremely important. The gas generant must be stable over a wide range of temperature and humidity conditions, and should be resistant to shock, so that the propellant pellets, grains, granules, etc. maintain mechanical strength and integrity during the life of the vehicle.

Vehicle manufacturers have developed a number of quantitative tests to determine whether an air bag restraint system will operate reliably when needed during any part of a vehicle's useful life. Although these tests and the performance requirements that an inflator should meet in these tests vary somewhat from manufacturer to manufacturer, the design criteria of all the vehicle manufacturers are essentially the same.

In a typical prior art passive restraint system the inflation gas is nitrogen, which is produced by the decomposition reaction of a gas generant containing a metal azide, typically sodium azide ($NaN_3$). The metal azide is the fuel and the principal gas generating compound in the gas generant used in the inflator. A typical metal azide gas generant is disclosed in U.S. Pat. No. Re. 32,584.

The gas produced in sodium azide based inflators is relatively pure nitrogen. Because there is no carbon in the fuel, oxides of nitrogen, $NO_x$, can be controlled easily by running the propellant under slightly fuel rich conditions. In contrast, the combustion of gas generants containing carbon, nitrogen, and oxygen, when formulated to be fuel rich, results in the production of carbon monoxide (CO), a toxic gas. If excess oxygen is present in such a composition to assure the complete oxidation of CO to carbon dioxide, the excess oxygen will react with nitrogen at the propellant combustion temperature to form oxides of nitrogen, which can also be toxic. Therefore, the mixture of oxidizer and fuel must approach a stoichiometric balance in gas generants of this type to avoid the production of toxic gases.

Inflator designs based on sodium azide have been shown to meet the requirements of vehicle manufacturers, and are used today in most passive restraint systems. However, there are disadvantages to this technology, including the production of large quantities of hot, solid particulates during combustion, such as sodium oxide, a highly caustic material, which results in added complexity and cost in the inflator design. The relatively high toxicity of the raw sodium azide (oral rat $LD_{50}$ of about 45 mg/kg), which must be handled during the inflator manufacturing process, can also create a disposal problem at the end of the useful life of the vehicle.

Because typical gas generants used in inflators produce solid particulates, filters must be incorporated into the inflator to separate the hot particulates from the gas prior to exhausting the gas from the inflator into the air bag. Filters are required in virtually all driver and passenger side air bag inflators that incorporate purely pyrotechnic gas generants, including sodium azide based air bag inflators because of the significant amounts of solids produced during the decomposition of the oxidizer and the combustion of the fuel. The solids produced during the combustion of the gas generant are separated from the gas stream to prevent exposure of vehicle occupants to excessive or toxic levels of airborne particulates during and after air bag deployment. The need for filters, as well as the toxicity of the sodium azide, adds to the cost of producing a typical prior art inflator.

As a result of the problems associated with sodium azide based gas generants, there is movement away from sodium azide based technology to "non-azide" based technology, which uses gas generating compositions, i.e., gas generants, that are typically simple organic fuels, such as hydrocarbons, carbohydrates, or derivatives thereof used in concert with one of the more classic pyrotechnic oxidizer, such as potassium perchlorate, potassium nitrate, or strontium nitrate. These compositions have been used as gas generants in purely pyrotechnic inflators and as gas generants and heaters in hybrid inflators, which incorporate both a pyrotechnic element and stored pressurized gas. The main problem with compositions using these oxidizers is still the copious amount of solids produced by these oxidizers upon combustion. When used with a fuel which does not produce solids, the prior art non-azide gas generants are an improvement over sodium azide based generants, but still require extensive filtration prior to the gas exiting the inflator because of the particulates produced by the oxidizers. This results in an inflator that is larger and more expensive than would otherwise be necessary.

Attempts have been made to use ammonium nitrate with a phase stabilizer as an oxidizer, but, generally, these compositions do not hold up to the extensive thermal cycling that can occur in automotive applications. Ammonium perchlorate mixed with an alkali metal nitrate or carbonate in essentially equimolar amounts has also been used, where the alkali metal salt is added to neutralize the hydrogen chloride, HCl, produced by the combustion of the ammonium perchlorate. The resulting combination produces only 50 to 60 percent of the solids produced by the more traditional oxidizers. When ammonium perchlorate/alkali metal salt based compositions are used with a low solids fuel that requires very little oxygen to burn stoichiometrically, the result is a low solids producing gas generant that requires substantially less or even no filter when used in an automotive inflator. For example, U.S. Pat. No. 5,780,768 discloses a mixture of guanidine nitrate, ammonium perchlorate, and sodium nitrate that produces only about 12.5 percent solids upon combustion. This mixture has been successfully used in a driver side inflator without a filter, and is a dramatic improvement over more conventional technology. However, this composition still requires relatively high pressures to combust. A further reduction of solids produced from the unit, as well as a reduction in the combustion temperature, is also desirable.

"Hybrid" inflators that use stored pressurized gas for part of the inflator gas supply are another means used to control solid particulate production, since smaller amounts of solid particulate producing gas generant can be used to obtain the same inflator gas output. In addition, the stored pressurized gas, which is typically an inert gas mixed with oxygen to supplement combustion and decrease the level of toxics, cools the gas that flows from the inflator, and results in a greater degree of condensation and solidification within the inflator. Thus, the amount of particulates introduced into the air bag and the vehicle interior is reduced.

The combination of greater condensation of solids within the inflator and the reduction in the total amount of solids produced eliminates the need for filters in hybrid inflators. However, hybrid inflators are typically larger and heavier, and have decreased reliability resulting from storing a pressurized gas over the lifetime of the vehicle.

U.S. Pat. No. 5,538,567 discloses a gas generating propellant, which produces nitrogen, carbon dioxide, and steam on combustion, consisting essentially of guanidine nitrate, a flow enhancer, such as carbon black, a binder, such as calcium resinate, and an oxidizer selected from the group consisting of potassium perchlorate and ammonium perchlorate. The production of only nitrogen, carbon dioxide, steam, and minor amounts of hydrogen and carbon monoxide is disclosed. However, only a single composition comprising potassium perchlorate is exemplified. There is no example of compositions incorporating ammonium perchlorate, which produces significant quantities of hydrogen chloride (HCl) during combustion.

U.S. Pat. No. 5,545,272 discloses a gas generating composition consisting essentially of about 35 to 55 percent by weight nitroguanidine and about 45 to 65 percent by weight phase stabilized ammonium nitrate, and may include a flow enhancer or a molding facilitator. The phase stabilizer is typically a potassium salt. Although ammonium nitrate produces clean non-toxic gases, and is free of solids upon combustion, ammonium nitrate has a crystal transition or phase stability problem, resulting from the four phase transitions ammonium nitrate crystals undergo over the temperature range typically experienced in storage. Each of these transitions results in a change of crystal volume, which may cause a slow breakup of propellant grains during thermal cycling from high to low temperature. However, ammonium nitrate crystals can be "phase stabilized" using additives, such as potassium perchlorate and potassium nitrate. The effectiveness of these additives varies depending upon the particular additive used. However, most of the known additives useful as phase stabilizers produce solids upon combustion, and, thus, increase the production of solids by the propellant.

Therefore, a need exists for pyrotechnic materials that can be used as low solids producing gas generants that minimize or eliminate the need for inflator filters or other means for separating solids from the gases produced. The present invention provides such pyrotechnic materials.

SUMMARY OF TEE INVENTION

The present invention is directed to a pyrotechnic material comprising at least one fuel and an oxidizer of ceric ammonium nitrate or a mixture of ceric ammonium nitrate and one or more other oxidizers, and, optionally, sub-micron (i.e., having an average particle size of less than about 1 $\mu$m)

fumed silica, such as Cabosil®. Typically, the at least one fuel is selected from the group consisting of hydrocarbons, carbohydrates, alcohols, aldehydes, ketones, amines, imines, organic acids, organic nitro compounds, organic nitroso compounds, high nitrogen containing organic compounds, and carbon. Preferably, the fuel is selected from the group consisting of guanidine nitrate, nitroguanidine, cellulose, cellulose acetate, 5-aminotetrazole (5-ATZ), 5-nitrouracil, azo-dicarbonamide, and glycidal azide polymer.

Oxidizers that may be mixed with the ceric ammonium nitrate oxidizer include, but are not limited to lithium nitrate, sodium nitrate, potassium nitrate, strontium nitrate, lithium perchlorate, sodium perchlorate, potassium perchlorate, phased stabilized ammonium nitrate, a solid solution of ammonium nitrate and potassium nitrate, a solid solution of ammonium nitrate and potassium perchlorate, and a mixture of ammonium perchlorate and at least one alkali metal salt, for example, lithium carbonate, lithium nitrate, sodium nitrate, potassium nitrate, and mixtures thereof.

The pyrotechnic material of the invention may also comprise burn rate catalysts, coolants, flow aids, or other materials, as needed to meet the requirements of a particular application.

In a preferred embodiment, the pyrotechnic material is a low solids gas generant comprising an oxidizer-fuel mixture within about 4 percent of stoichiometric balance, that produces less than about 30 percent solids on combustion, and may be formed as pressed pellets, grains, or granules.

The preferred gas generating compositions of the invention include the following mixtures:

A mixture of ceric ammonium nitrate, guanidine nitrate, and fumed silica; preferably from about 33 to about 48 percent by weight ceric ammonium nitrate, from about 49 to about 65 percent by weight guanidine nitrate, and from about 0 to about 5 percent by weight fumed silica.

A mixture of ceric ammonium nitrate, 5-Nitrouracil, and fumed silica; preferably from about 53 to about 65 percent by weight ceric ammonium nitrate, from about 31 to about 45 percent by weight 5-Nitrouracil, and from about 0 to about 5 percent by weight fumed silica.

A mixture of ceric ammonium nitrate, anhydrous 5-ATZ, and fumed silica; preferably, from about 57 to about 68 percent by weight ceric ammonium nitrate, from about 29 to about 40 percent by weight anhydrous 5-ATZ, and from about 0 to about 5 percent by weight fumed silica.

A mixture of ceric ammonium nitrate, azo-dicarbonamide, and fumed silica, preferably, from about 53 to about 65 percent by weight ceric ammonium nitrate, from about 32 to about 45 percent by weight azo-dicarbonamide, and from about 0 to about 5 percent by weight fumed silica.

A mixture of ceric ammonium nitrate, nitroguanidine, and fumed silica, preferably, from about 37 to about 52 percent by weight ceric ammonium nitrate, from about 45 to about 61 percent by weight nitroguanidine, and from about 0 to about 5 percent by weight fumed silica.

A mixture of ceric ammonium nitrate, glycidal azide polymer, penta erythritol triacrylate, superfine $Fe_2O_3$, lecithin, and carbon black, preferably about 70 to about 82 percent by weight ceric ammonium nitrate, from about 14 to about 28 percent by weight glycidal azide polymer, from about 0.5 to about 3 percent by weight penta erythritol triacrylate, from about 0 to about 4 percent by weight superfine $Fe_2O_3$, from about 0 to about 3 percent by weight lecithin, and from about 0 to about 2 percent by weight carbon black.

A mixture of ceric ammonium nitrate, cellulose, and fumed silica, preferably, from about 71 to about 80 percent by weight ceric ammonium nitrate, from about 17 to about 27 percent by weight cellulose, and from about 0 to about 5 percent by weight fumed silica.

A mixture of ceric ammonium nitrate, cellulose acetate, and fumed silica, preferably, from about 73 to about 82 percent by weight ceric ammonium nitrate, from about 15 to about 25 percent by weight cellulose acetate, and from about 0 to about 5 percent by weight fumed silica.

DETAILED DESCRIPTION OF THE PREFERRED EMBODIMENTS

Unless otherwise stated, all references to "percent" or "%" mean percent by weight based on the total weight of the composition.

As used herein, the term "stoichiometric balance" means that the ratio of oxidizer to fuel is such that upon combustion of the composition all of the fuel is fully oxidized, and no excess of oxygen is produced. A "near stoichiometric balance" is one in which the ratio of oxygen mass surplus or deficit to total mixture mass is within about 4 percent of a stoichiometric balance.

As used herein, the terms "low solids" and "low levels of solids" mean that, upon combustion, the gas generant produces substantially lower solids than gas generants used in prior art pyrotechnic inflators, such as sodium azide based inflators, which produce about 60 percent solids on combustion. The gas generants of the invention typically produce less than about 30 percent solids. This is advantageous in that it minimizes or eliminates the need for a filter in the inflator, thus, simplifying inflator design.

The invention is directed to pyrotechnic materials comprising at least one fuel and a low solids producing oxidizer of ceric ammonium nitrate or a mixture of ceric ammonium nitrate and one or more other oxidizers that may be formulated for use as low solids producing gas generants. Preferred embodiments of the invention are well suited as non-azide gas generants for use in filterless vehicle air bag inflators, that is, gas generants that do not require a metal azide as a necessary component. The compositions disclosed herein produce low levels of solids during combustion, and minimize or eliminate the need for filters or hybrid operation in inflators.

Ceric ammonium nitrate is a unique oxidizer, which may be used with a large variety of fuels to produce pyrotechnic materials that generate low amounts of solids on combustion. When ceric ammonium nitrate is combined with the proper fuel, the resulting compositions are particularly useful as "low solids" gas generating compositions. However, prior to the present invention, there is no known disclosure of the use of ceric ammonium nitrate as an oxidizer in "low solids" gas generating compositions.

Ceric ammonium nitrate produces a very low quantity of solids, typically, less than 0.3 grams of solid $Ce_2O_3$ per gram of ceric ammonium nitrate combusted, and a reasonably large amount of excess oxygen upon decomposition, i.e., 0.365 grams of oxygen produced per gram of ceric ammonium nitrate decomposed. The solids produced by ceric ammonium nitrate may be solid or liquid at the combustion temperature of the gas generant, thus making the solids easier to contain than salts, such as KCl or NaCl, which are often gaseous at the combustion temperature of many gas generants. The melting points of the typical solid combustion products of ceric ammonium nitrate are 1692° C. for $Ce_2O_3$ and 2600° C. for $CeO_2$. The boiling point for KCl is 1500° C., and the boiling point for NaCl is 1413° C. Common adiabatic combustion temperatures of gas generants range from about 1100° C. to about 2500° C.

The solids produced by the combustion of ceric ammonium nitrate as an oxidizer for a pyrotechnic material are refractory ceramics with very high densities, i.e., 6.86 g/cc for $Ce_2O_3$, and 7.13 g/cc for $CeO_2$, as compared to 1.98 g/cc for KCl and 2.17 g/cc for NaCl. As a result of the refractory nature of these compounds, molten $Ce_2O_3$ and $CeO_2$ are typically viscous like glass. The combination of the viscous nature and the very high-density of these compounds in the molten state results in significantly reduced production of airborne particles on combustion in a gas generator when compared to prior art gas generant compositions. Any particles produced by the use of ceric ammonium nitrate as an oxidizer tend to clump up, and stay inside the gas generator, rather than exiting the unit, and becoming airborne.

Ceric ammonium nitrate has a very large negative heat of formation, approximately −850 cal/g. This results in lower energy compositions than most other low solids oxidizer systems when formulated with fuels to form stoichiometric compositions. For example, a stoichiometric mixture of guanidine nitrate and ceric ammonium nitrate has a measured heat of reaction of 956 cal/g, where a stoichiometric mixture of guanidine nitrate and an oxidizer of equimolar amounts of ammonium perchlorate and sodium nitrate has a measured heat of reaction of 1090 cal/g. Both mixtures produce about 12.5% solids, but the lower heat of reaction of the ceric ammonium nitrate based mix results in lower gas temperatures. This is a very desirable attribute in an automotive air bag.

A variety of gas generant formulations using ceric ammonium nitrate as the oxidizer tend to ignite and burn more readily at low pressures than equivalent systems using other low solids oxidizer systems. For example, a stoichiometric mixture of 5-nitrouracil and ceric ammonium nitrate ignites readily with a small flame at ambient conditions, and burns steadily until completion after the flame is removed. A similar composition using an equimolar mixture of ammonium perchlorate and sodium nitrate as the oxidizer will not ignite at ambient conditions under the same circumstances.

Due to the unique properties of ceric ammonium nitrate as an oxidizer in gas generants, it may be used with virtually any fuel to form a gas generating composition which produces relatively cool gases. The resulting compositions will have lower solids than similar compositions using the more traditional oxidizers such as potassium perchlorate, potassium nitrate, or strontium nitrate. It has been found that ceric ammonium nitrate burns readily at ambient pressure when formulated with many fuels in stoichiometric proportions. This very unusual behavior for a low solids producing gas generating compositions demonstrates that very low pressure combustion of ceric ammonium nitrate gas generants is possible. Such low pressure combustion with compositions which require little or no filter when used in an inflator allows for much simpler, less expensive inflator designs. The extremely high density of the solid combustion products of mixes containing ceric ammonium nitrate allows for higher mass percentages of the solids produced without increasing the airborne particulates generated by the inflator. This is because a greater percentage of the solids remain in the inflator. Additionally, the solids that do leave the inflator tend to settle in the bag and in the atmosphere much more quickly than the solids produce during combustion in prior art inflators, again, resulting in less airborne particulates.

Ceric ammonium nitrate may be formulated in stoichiometric proportions with virtually any non-solid producing organic fuel to produce a low solids gas generating composition that produces less than 30 percent by weight of solids upon combustion. Because of the nature of the solid combustion products produced, any of these compositions may potentially be used in a inflator without a filter, and still meet airborne particulate requirements. The only limitation on non-solid producing organic fuels for gas generants in automotive applications is that they do not produce any toxic gases upon stoichiometric combustion with oxygen. Generally speaking this limits the selection of organic fuels to those composed of nitrogen, carbon, oxygen, and hydrogen. If the compound produces solids upon combustion, e.g., a salt of an organic compound, then the only limitation is that the final as generating compositions produce less than the 30% solids required to yield a low solids gas generating composition. Small amounts of compounds such as chlorine are acceptable provided enough of an alkali metal salt such as sodium nitrate is included in the mixture to neutralize the HCl produced by combustion. Again, the end resulting mix must produce less than about 30% solids upon combustion.

These requirements generally limit the selection of organic fuels to the following groups of compounds and their respective non-solid producing salts (e.g., carbonates, oxalates, and nitrates): hydrocarbons, carbohydrates, alcohols, aldehydes and ketones, amines and imines, organic nitro and nitroso compounds, high nitrogen containing organic compounds, such as azides, azoles, azines, and aza and azo compounds, and carbon. However, any other fuel that produces relatively low solids and a minimum of toxic combustion products may also be used.

Composite propellant polymeric fuels useful in the invention include, but are not limited to, polybutadiene derivatives, such as HTPB, CTPB, PBAA, and PBAN, vinyl and polyvinyl derivatives, such as PVC, polyvinyl alcohol, and polyvinyl acetate, cellulose and cellulose derivatives, such as cellulose acetate, polyethylene glycol, epoxies, polyacrylics and acrylic derivatives, such as polymethyl methacrylate, and energetic binder fuels, such as glycidal azide polymer.

Nonpolymeric organic fuels useful in the invention include, but are not limited to ammonium, guanidine, and urea salts and their derivatives, such as ammonium oxalate, ammonium hydrogen oxalate, tetramethyl ammonium nitrate, tetraethyl ammonium nitrate, guanidine nitrate, guanidine carbonate, triaminoguanidine nitrate and urea oxalate; organic amines and imines, such as alloxan, allantion, barbituric acid, biuret, cyanuric acid, dicyandiamide, hexamine, malonamide, oxamide, oxamic acid, oxalic acid dihydrazide, and oxalic acid monohydrazide; organic acids such as citric acid, alloxanic acid, and oxalic acid; organic azo, diazo, aza, azide, and azines, such as 5-aminotetrazole, azo-dicarbonamide, and tetrazole; organic nitro compounds, such as nitroguanidine, 5-nitrouracil, nitrofurantion, and tris hydroxymethyl nitromethane; carbohydrates, such as sucrose and cellulose; alcohols, aldehydes and ketones such as pentaerythritol and 1,2 dioxo, hexahdro 1,3,5 triazine; and carbon.

Preferred fuels for use in the invention, include guanidine nitrate, $CH_6N_4O_3$, nitroguanidine, $CH_4N_4O_2$, cellulose, cellulose acetate, 5-aminotetrazole, 5-nitrouracil, azo-dicarbonamide, and glycidal azide polymer. These fuels provide clean combustion products when properly mixed with an appropriate oxidizer. Most oxidizers used in the air bag industry produce significant quantities of solids. Therefore, the amount of solids produced by the combustion of the generant compositions of the invention is determined by the amount of oxidizer in the propellant. Guanidine nitrate and nitroguanidine require a minimum quantity of oxidizer, and thus, produce low solids on combustion. Additionally, cellulose, cellulose acetate, 5-aminotetrazole, 5-nitrouracil, azo-dicarbonamide, and glycidal azide polymer require a low enough quantity of oxidizer to produce sufficiently low quantities of solids to allow their use with little or no filtration.

Oxidizers that produce relatively low solids, and may be combined with ceric ammonium nitrate to form a low solids oxidizer include, but are not limited to, lithium nitrate, sodium nitrate, potassium nitrate, strontium nitrate, lithium perchlorate, sodium perchlorate, potassium perchlorate, phase stabilized ammonium nitrate, a solid solution of ammonium nitrate with potassium nitrate, a solid solution of ammonium nitrate with potassium perchlorate, a mixture of ammonium perchlorate and at least one alkali metal salt, and mixtures thereof. The combination of ammonium nitrate with other salts in solid solution is intended to phase stabilize the ammonium nitrate.

When ammonium perchlorate is included in the oxidizer, a highly alkaline material must be produced during combustion of the gas generant to neutralize or scavenge HCl produced during combustion. The alkali metal salts of the invention, $Li_2CO_3$, $LiNO_3$, $NaNO_3$, and $KNO_3$, burn to form the corresponding alkali metal oxides (i.e.: $Li_2O$, $Na_2O$, and $K_2O$), which, in turn, being extremely alkaline, react with the HCl to form the alkali metal chloride and water. The metal oxides produced by the combustion of salts of metals other than the group IA alkali metals are typically not basic enough to effectively scavenge HCl. Alkali metal salts are used with an ammonium perchlorate oxidizer in the compositions of the invention to meet representative gas toxicity requirements. As one of ordinary skill in the art will recognize, an ammonium perchlorate based oxidizer system can use a single alkali metal salt or multiple alkali metal salts mixed in any proportion, as long as the total amount of alkali metal oxide produced during combustion is at least sufficient to scavenge all of the HCl produced. One of ordinary skill in the art will also recognize that an excess amount of salt can be utilized, as long as the resulting composition is low solids producing.

To meet representative toxicity requirements, the sum of the charges in a vehicle air bag inflator must approach a near stoichiometric balance of oxidizer and fuel. For practical systems, the oxygen balance of the system must be within about 4 percent of the theoretical stoichiometric balance, or the gases produced will contain too much CO or $NO_x$, depending on whether excess fuel or excess oxidizer is present. However, as long as the entire system is close to a stoichiometric balance, and any divergence in the main charge is compensated for by an opposite divergence in the enhancer, the individual charges need not be in stoichiometric balance. For example, the main gas generant charge can be fuel rich if the enhancer charge is oxidizer rich, and the entire system is within about 4 percent of a stoichiometric balance. In general, however, having all charges in stoichiometric balance provides a lower level of toxic compounds in the inflator effluent gases. In light of these requirements for temperature, stoichiometry, and solids production, guanidine nitrate, nitroguanidine, 5-aminotetrazole, 5-nitrouracil, 5-ATZ, azo-dicarbonamide, glycidal azide polymer, cellulose and cellulose acetate are preferred fuels. These fuels produce less than about 25 percent solids when combusted with cerium ammonium nitrate. Moreover, when ceric ammonium nitrate is formulated with the most preferred fuel, i.e., guanidine nitrate, nitroguanidine, 5-nitrouracil, 5-ATZ, and azo-dicarbonamide, the resulting compositions produce less than about 20 percent by weight solids on combustion. Preferred, non-limiting ceric ammonium nitrate based main charge gas generants that meet the requirements discussed above are listed below.

Ceric Ammonium Nitrate/Guanidine Nitrate
  41.7% wt. Ceric Ammonium Nitrate
  57.9% wt. Guanidine Nitrate
  0.4% wt. Cabosil
  This mixture produces about 13% solids by weight, has a measured heat of reaction of 956 cal./g, a measured melting point by DSC of about 165° C., and an adiabatic flame temperature of about 2100° C. at 5000 psi.

Ceric Ammonium Nitrate/5-Nitrouracil
  60.2% wt. Ceric Ammonium Nitrate
  39.2% wt. 5-Nitrouracil
  0.6% wt. Cabosil
  This mixture produces about 18.6% solids by weight and has an adiabatic flame temperature of about 2450° C. at 1000 psi.

Ceric Ammonium Nitrate/Anhydrous 5-ATZ
  64.0% wt. Ceric Ammonium Nitrate
  35.4% wt. Anhydrous 5-ATZ
  0.6% wt. Cabosil
  This mixture produces about 19.8% solids by weight, and has an adiabatic flame temperature of about 2600° C. at 1000 psi.

Ceric Ammonium Nitrate/Azo-dicarbonamide
  59.8% wt. Ceric Ammonium Nitrate
  39.6% wt. Azo-dicarbonamide
  0.6% wt. Cabosil
  This mixture produces about 18.5% solids by weight, and has an adiabatic flame temperature of about 2270° C. at 1000 psi.

Ceric Ammonium Nitrate/Nitroguanidine
  45.5% wt. Ceric Ammonium Nitrate
  54.0% wt. Nitroguanidine
  0.5% wt. Cabosil
  This mixture produces about 14.1% solids by weight, and has an adiabatic flame temperature of about 2500° C. at 1000 psi.

Ceric Ammonium Nitrate/Glycidal Azide Polymer
  76.5% wt. Ceric Ammonium Nitrate
  18.6% wt. Glycidal Azide Polymer
  1.40% wt. Penta Erythritol Triacrylate
  2.00% wt. Nanocat (superfine Fe2O3)
  1.00% wt. Lecithin
  0.5% wt. Carbon Black
  This mixture produces about 24.7% solids by weight, and has an adiabatic flame temperature of about 2675° C. at 1000 psi.

Ceric Ammonium Nitrate/Cellulose
  75.8% wt. Ceric Ammonium Nitrate
  23.4% wt. Cellulose
  0.8% wt. Cabosil
  This mixture produces about 23.5% solids by weight, and has an adiabatic flame temperature of about 2430° C. at 1000 psi.

Ceric Ammonium Nitrate/Cellulose Acetate
  77.8% wt. Ceric Ammonium Nitrate
  21.4% wt. Cellulose Acetate
  0.8% wt. Cabosil
  This mixture produces about 24.1% solids by weight, and has an adiabatic flame temperature of about 2500° C. at 1000 psi.

Sub-micron fumed silica, such as Cabosil®, a product of Cabot Corporation of Tuscola, Ill., is typically added to compositions containing a hygroscopic ingredient. Cabosil® and similar very fine, sub-micron particle size, high surface area fumed silicas, minimize contamination by moisture, and act as a flow aid when the compositions are in a powdered form prior to pressing into grains or pellets.

Some of the fuels of the invention do not possess very good binding characteristics, and, thus, may require a binder for the formation of pellets, grains, or granules.

The preferred compositions, listed above, all contain sufficient oxidizer to be stoichiometric with respect to fuel and oxidizer. However, as noted above, a variation from stoichiometric balance is acceptable, as long as the oxygen balance is within about 4 percent of the theoretical stoichiometric balance.

While it is apparent that the invention disclosed herein is well calculated to fulfill the objects stated above, it will be appreciated that numerous modifications and embodiments may be devised by those skilled in the art. Therefore, it is intended that the appended claims cover all such modifications and embodiments as falling within the true spirit and scope of the present invention.

We claim:

1. A pyrotechnic material comprising at least one fuel and a oxidizer comprising ceric ammonium nitrate, wherein the at least one fuel is selected from the group consisting of guanidine nitrate, nitroguanidine, cellulose, cellulose acetate, 5-aminotetrazole, 5-nitrouracil, azo-dicarbonamide, glycidal azide polymer, and mixtures thereof, and the ceric ammonium nitrate is present in an amount of at least about 33 percent by mass, such that the fuel and ceric ammonium nitrate oxidizer have an oxygen balance within about four percent of a theoretical stoichiometric balance.

2. The pyrotechnic material of claim 1, wherein the oxidizer further comprises at least one oxidizer selected from the group consisting of lithium nitrate, sodium nitrate, potassium nitrate, strontium nitrate, lithium perchlorate, sodium perchlorate, potassium perchlorate, phase stabilized ammonium nitrate, a solid solution of ammonium nitrate with potassium nitrate, a solid solution of ammonium nitrate with potassium perchlorate, and a mixture of ammonium perchlorate and at least one alkali metal salt.

3. The pyrotechnic material of claim 1, further comprising sub-micron fumed silica.

4. The pyrotechnic material of claim 1, wherein the pyrotechnic material is a low solids gas generant comprising an oxidizer-fuel mixture within about 4 percent of stoichiometric balance, and produces less than about 30 percent solids on combustion.

5. The pyrotechnic material of claim 4, wherein the gas generant is in the form of pressed pellets, grains, or granules.

6. The pyrotechnic material of claim 1, wherein the pyrotechnic material comprises from about 33 to about 48 percent by weight ceric ammonium nitrate, from about 49 to about 65 percent by weight guanidine nitrate, and from about 0 to about 5 percent by weight fumed silica.

7. The pyrotechnic material of claim 6, wherein the pyrotechnic material comprises about 41.7 percent by weight ceric ammonium nitrate, about 57.9 percent by weight guanidine nitrate, and about 0.40 percent by weight fumed silica.

8. The pyrotechnic material of claim 1, wherein the pyrotechnic material comprises from about 53 to about 65 percent by weight ceric ammonium nitrate, from about 31 to about 45 percent by weight 5-Nitrouracil, and from about 0 to about 5 percent by weight fumed silica.

9. The pyrotechnic material of claim 8, wherein the pyrotechnic material comprises about 60.2 percent by weight ceric ammonium nitrate, about 39.2 percent by weight 5-Nitrouracil, and about 0.60 fumed silica.

10. The pyrotechnic material of claim 1, wherein the pyrotechnic material comprises from about 57 to about 68 percent by weight ceric ammonium nitrate, from about 29 to about 40 percent by weight anhydrous 5-ATZ, and from about 0 to about 5 percent by weight fumed silica.

11. The pyrotechnic material of claim 10, wherein the pyrotechnic material comprises about 64.0 percent by weight ceric ammonium nitrate, about 35.4 percent by weight anhydrous 5-ATZ, and about 0.60 percent by weight fumed silica.

12. The pyrotechnic material of claim 1, wherein the pyrotechnic material comprises from about 53 to about 65 percent by weight ceric ammonium nitrate, from about 32 to about 45 percent by weight azo-dicarbonamide, and from about 0 to about 5 percent by weight fumed silica.

13. The pyrotechnic material of claim 12, wherein the pyrotechnic material comprises about 59.8 percent by weight Ceric Ammonium Nitrate, about 39.6 percent by weight azo-dicarbonamide, and about 0.60 percent by weight fumed silica.

14. The pyrotechnic material of claim 1, wherein the pyrotechnic material comprises from about 37 to about 52 percent by weight ceric ammonium nitrate, from about 45 to about 61 percent by weight nitroguanidine, and from about 0 to about 5 percent by weight fumed silica.

15. The pyrotechnic material of claim 14, wherein the pyrotechnic material comprises about 45.5 percent by weight ceric ammonium nitrate, about 54.0 percent by weight nitroguanidine, and about 0.50 percent by weight fumed silica.

16. The pyrotechnic material of claim 1, wherein the pyrotechnic material comprises from about 71 to about 80 percent by weight ceric ammonium nitrate, from about 17 to about 27 percent by weight cellulose, and from about 0 to about 5 percent by weight fumed silica.

17. The pyrotechnic material of claim 16, wherein the pyrotechnic material comprises about 75.8 percent by weight ceric ammonium nitrate, about 23.4 percent by weight cellulose, and about 0.8 percent by weight fumed silica.

18. The pyrotechnic material of claim 1, wherein the pyrotechnic material comprises from about 73 to about 82 percent by weight ceric ammonium nitrate, from about 15 to about 25 percent by weight cellulose acetate, and from about 0 to about 5 percent by weight fumed silica.

19. The pyrotechnic material of claim 18, wherein the pyrotechnic material comprises about 77.8 percent by weight ceric ammonium nitrate, about 21.4 percent by weight cellulose acetate, and about 0.8 percent by weight fumed silica.

* * * * *